Figure 1:
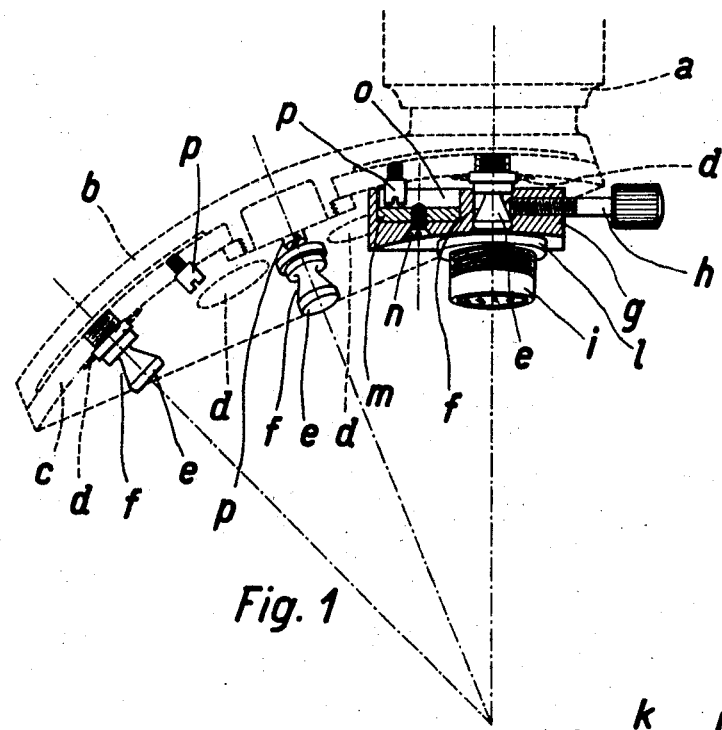

Oct. 2, 1934.  W. BAUERSFELD  1,975,629

ADJUSTING DEVICE FOR A PAIR OF OBJECTIVES OF BINOCULAR MICROSCOPES

Filed Oct. 19, 1933

Inventor:
Walther Bauersfeld.

Patented Oct. 2, 1934

1,975,629

UNITED STATES PATENT OFFICE 1,975,629

ADJUSTING DEVICE FOR A PAIR OF OBJECTIVES OF BINOCULAR MICROSCOPES

Walther Bauersfeld, Jena, Germany, assignor to the firm of Carl Zeiss, Jena, Germany Application October 19, 1933, Serial No. 694,266
In Germany October 22, 1932

3 Claims. (Cl. 88—39)

An application has been filed in Germany, October 22, 1932.

The invention concerns an adjusting device for a pair of objectives of binocular microscopes which is attached to an objective carrier and consists of two equal objectives whose axes intersect each other. The objective carrier of the new adjusting device is so mounted on the carrier for the other optical parts of the microscope as to be rotatable about an axis which bisects the angle embraced by the axes of the pair of objectives, the objective carrier being provided with a radially grooved disc which is rotatable about an eccentric axis and may be adjusted in any position and whose groove receives a pin attached to the microscope. What has been said above with respect to the microscope applies as well to the movable part of an objective changing device which may be disposed between the microscope proper and the pair of objectives. For instance, when using slide changing devices, the adjusting device is to be mounted on the movable slide, and when using revolving nose pieces, the said adjusting device is to be attached to the rotatable part of the nose-piece, each pair of objectives having an adjusting device of its own. The new adjusting device offers the advantage that small rotations of the two objectives about an axis bisecting its axial angle may be effected rapidly and that, subsequently to the grooved disc having been fixed in that position which had been found to be the correct one, the pair of objectives and the adjusting device may be removed from the microscope tube or the changing device and reattached to the microscope in the correct position without the necessity of any readjustment.

With a view to avoiding any errors in the adjustment, which may be due to slight differences of the focal lengths of the two objectives representing one pair, it is advisable to so attach the objectives in the objective carrier of the adjusting device as to make them adjustable in the directions of their axes. The connexion of the objective carrier and the microscope tube, or of the said carrier and the movable part of the objective changing device, is conveniently effected by means of at least one pressure bolt whose axis is approximately at right angles to the axis of rotation of the objective carrier and which extends into a conical notch in a journal representing an axle of rotation. Naturally, the said notch is to be disposed in such a manner that the part having the greatest diameter faces the objectives, which ensures that screwing the pressure bolt against the said journal makes the objective carrier lie tightly against the microscope tube or the changing device.

Figures 2, 3:
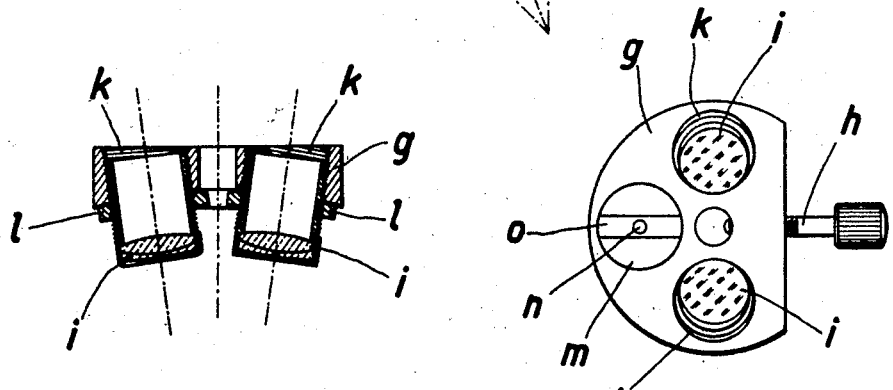

In the accompanying drawing which illustrates the invention, Figure 1 represents in central elevational section a constructional example of the new adjusting device, it being assumed that the used microscope is provided with a revolving nosepiece for four pairs of objectives. Those parts which do not belong to the adjusting device proper are indicated by dash lines. The constructional example is shown in central section in side view by Figure 2 and in top plan view by Figure 3.

The microscope used in connection with the constructional example is indicated by the tube part $a$, which is illustrated in the drawing by means of dash lines. To this tube $a$ is attached a spherical bowl $b$ in which a spherical bowl $c$ is rotatably mounted. This bowl $c$ has eight apertures $d$ which are arranged in pairs and provide for the passage of light. Between the two apertures $d$ of each pair is screwed a journal $e$ having a conical notch $f$ and which represents the axle of rotation of an objective carrier $g$ that is so pressed to the bowl $c$ by means of a pressure bolt $h$ as to assume the position represented in the drawing. Two equal objectives $i$ are screwed into bores $k$ in the objective carrier $g$, these objectives $i$ being secured by means of nuts $l$, and the said bores $k$ being so positioned that the angle embraced by their axes is bisected by the axis of the journal $e$. In an eccentric recess in the objective carrier $g$ is disposed a rotatable circular disc $m$ which may be so adjusted by means of a screw $n$ as to assume any desired position. The disc $m$ has a radial groove $o$ into which a pin $p$ attached to the bowl $c$ extends eccentrically.

When the two objectives $i$ are to be adjusted, the screw $n$ is loosened to such an extent that the disc $m$ may still be turned in the objective carrier $g$. The objective carrier $g$ is now rotated until the objectives assume their correct lateral positions relative to the microscope $a$. When this rotation is being effected, also the disc $m$ rotates in the objective carrier $g$, since the pin $p$ remains in its position. When the screw $n$ has been screwed tight and the nuts $l$ are loosened and the two objectives $i$ so adjusted as to image the object plane in the ocular image plane, the objective carrier $g$ and the objectives $i$ may be removed from the microscope, subsequently to the pressure bolt $h$ having been loosened, without any disturbance of the adjustment having to be feared. The new device effects that, subsequently to another attachment by means of the pressure bolt $h$, the objectives $i$ may assume their correct positions without the requirement of any further adjustment.

I claim:

1. An adjusting device for a pair of objectives of binocular microscopes, comprising a carrier having two guides for two microscope objectives, the axes of these guides intersecting each other, means for so attaching the said carrier to a microscope as to be rotatable about an axis bisecting the angle embraced by the axes of the said two guides, a disc rotatably mounted on the carrier eccentrically of the axis of rotation of the carrier, this disc having a radial groove, and a pin cooperating with the groove and adapted to be mounted on the microscope.

2. An adjusting device for a pair of objectives of binocular microscopes, comprising a carrier having two guides for two microscope objectives, these guides providing for the possibility of an axial displacement of the objectives, the axes of these guides intersecting each other, means for so attaching the said carrier to a microscope as to be rotatable about an axis bisecting the angle embraced by the axes of the said two guides, a disc rotatably mounted on the carrier eccentrically of the axis of rotation of the carrier, this disc having a radial groove, and a pin cooperating with the groove and adapted to be mounted on the microscope.

3. An adjusting device for a pair of objectives of binocular microscopes, comprising a carrier having two guides for two microscope objectives, the axes of these guides intersecting each other, a conically notched journal extending into the said carrier and adapted to be attached to the microscope, the axis of this journal bisecting the angle embraced by the axes of the said two guides, a pressure bolt at right angles to the axis of the said journal and adapted to cooperate with the conical part of this journal, a disc rotatably mounted on the carrier eccentrically of the axis of rotation of the carrier, this disc having a radial groove, and a pin cooperating with the groove and adapted to be mounted on the microscope.

WALTHER BAUERSFELD.